United States Patent
Jan et al.

(10) Patent No.: US 9,486,933 B2
(45) Date of Patent: Nov. 8, 2016

(54) BAND SAW WITH EMERGENCY STOP DEVICE

(75) Inventors: Long-Chang Jan, Changhua County (TW); Hsuan-Chu Liu, Taichung County (TW)

(73) Assignee: OAV EQUIPMENT & TOOLS, INC., Taichung County (TW)

( * ) Notice: Subject to any disclaimer, the term of this patent is extended or adjusted under 35 U.S.C. 154(b) by 760 days.

(21) Appl. No.: 12/654,982

(22) Filed: Jan. 12, 2010

(65) Prior Publication Data
US 2011/0167974 A1   Jul. 14, 2011

(51) Int. Cl.
| | |
|---|---|
| *B27B 13/14* | (2006.01) |
| *F16P 7/02* | (2006.01) |
| *F16D 59/02* | (2006.01) |
| *F16P 1/00* | (2006.01) |
| *F16D 127/00* | (2012.01) |

(52) U.S. Cl.
CPC ............... *B27B 13/14* (2013.01); *F16D 59/02* (2013.01); *F16P 1/00* (2013.01); *F16P 7/02* (2013.01); *F16D 2127/001* (2013.01); *Y10T 83/081* (2015.04); *Y10T 83/089* (2015.04); *Y10T 83/707* (2015.04); *Y10T 83/7226* (2015.04); *Y10T 83/85* (2015.04)

(58) Field of Classification Search
CPC ... B27B 13/14; F16D 49/00; F16D 2121/16; F16D 51/12; F16D 59/02; F16D 2127/008; F16D 2127/001; F16D 2127/02; F16P 7/02; F16P 1/00; Y10T 83/081; Y10T 83/089; Y10T 83/85; Y10T 83/707; Y10T 83/7226
USPC ............ 83/62.1, 788, 587, 58, 459, 522.12, 83/814; 188/171, 70 B, 74, 173; 192/144; 403/322.4; 24/602; 269/224, 254 CS
See application file for complete search history.

(56) References Cited

U.S. PATENT DOCUMENTS

| 586,745 | A | * | 7/1897 | Pierce et al. ..................... 188/83 |
|---|---|---|---|---|
| 1,684,815 | A | * | 9/1928 | Wells .............................. 83/798 |
| 1,757,785 | A | * | 5/1930 | Sullenberger ................. 83/62.1 |
| 1,927,203 | A | * | 9/1933 | De Groot ....................... 83/62.1 |
| 1,946,758 | A | * | 2/1934 | Powell .......................... 188/166 |
| 2,177,961 | A | * | 10/1939 | Farmer ........................... 188/58 |
| 2,389,376 | A | * | 11/1945 | Mandin .......................... 83/587 |
| 2,660,636 | A | * | 11/1953 | Wallace et al. ............. 200/82 B |
| 2,751,054 | A | * | 6/1956 | Del Re ....................... 192/219.6 |
| 2,833,975 | A | * | 5/1958 | Currie ............................ 318/369 |
| 2,875,858 | A | * | 3/1959 | Dunham ..................... 188/77 R |
| 3,115,956 | A | * | 12/1963 | Trombetta .................... 188/171 |
| 3,237,265 | A | * | 3/1966 | Florian ............................ 24/602 |

(Continued)

FOREIGN PATENT DOCUMENTS

DE          1 574 382     *  8/1971   ............. F16D 59/02

*Primary Examiner* — Clark F Dexter
(74) *Attorney, Agent, or Firm* — Muncy, Geissler, Olds & Lowe, P.C.

(57) ABSTRACT

An emergency stop device for a band saw includes a brake member moveable between a standby position and an active position where the brake member firmly urges and stops a running wheel of the band saw, around which a band saw blade is looped. The brake member is held by a retainer at the standby position when the emergency stop device is inactive. When the emergency stop device is started, the retainer is separated apart from the brake member for enabling the brake member to move by an actuation of a spring member from the standby position to the active position so as to stop the cutting motion of the band saw blade.

8 Claims, 8 Drawing Sheets

(56) References Cited

U.S. PATENT DOCUMENTS

| | | | |
|---|---|---|---|
| 3,241,205 A * | 3/1966 | Genin | 24/602 |
| 3,265,165 A * | 8/1966 | Stainken | 188/166 |
| 3,456,695 A * | 7/1969 | Akrenius | 83/788 |
| 3,638,521 A * | 2/1972 | Marckx et al. | 83/22 |
| 3,894,459 A * | 7/1975 | Deppe et al. | 83/567 |
| 4,051,756 A * | 10/1977 | Bognar et al. | 83/389 |
| 4,094,218 A * | 6/1978 | Flanigan et al. | 83/62.1 |
| 4,515,251 A * | 5/1985 | Wruk | 188/171 |
| 4,875,558 A * | 10/1989 | Berkhan et al. | 188/171 |
| 5,277,278 A * | 1/1994 | Mehlert et al. | 188/70 B |

\* cited by examiner

BAND SAW WITH EMERGENCY STOP DEVICE

BACKGROUND OF THE INVENTION

1. Field of the Invention

The present invention relates generally to band saws and more particularly, to an emergency stop device for use in cooperation with a band saw for urging and stopping a running drive or follower wheel around which an endless band saw blade is looped.

2. Description of the Related Art

FIG. 1 shows a conventional band saw 10 comprising mainly a drive wheel 12 directly connected with an output shaft 13 of a motor (not shown in the drawing), and a follower wheel 14 driven by the drive wheel 12 through an endless band saw blade 16, which is tensionally looped around the drive wheel 12 and the follower wheel 14. When the motor is started, it will drive the drive wheel 12 to rotate, which in turn drives the band saw blade 16 to rotate the follower wheel 14. In operation, a workpiece is placed on the worktable and pushed toward an exposed cutting portion 162 of the running band saw blade 16 for cutting. Since the running cutting portion 162 is exposed to ambient environment, the band saw 10 shall be operated carefully; otherwise, severe injury may occur to the operator. For safety, the conventional band saw is always equipped with kinds of an emergency stop device.

A well-known emergency stop mechanism adopted by the conventional band saw 10 includes an emergency stop button (not shown) electrically connected with the motor for an emergency shutting down the power of the motor that drives the drive wheel 12. However, because of the law of inertia, the drive wheel 12 and the follower wheel 14, which have great mass and will gain great angular momentum when they are rotating, won't stop running immediately after the power of the motor is shut down, resulting in that the cutting motion of the band saw blade 16 will continue for a while after the motor is power-off. In light of this, it is desired to have an improved emergency stop device that can stop the cutting motion of the band saw blade immediately after the motor that drives the drive wheel is power-off.

SUMMARY OF THE INVENTION

The present invention has been accomplished in view of the above-noted circumstances. It is an objective of the present invention to provide an emergency stop device that can stop the cutting motion of the band saw blade immediately after the motor is power-off for lowering the possibility of damage when the band saw is in the emergency situation.

To achieve the objective of the present invention, the emergency stop device for a band saw for stopping a running wheel of the band saw, around which a band saw blade is looped, comprises a brake member, a spring member and a retainer. The brake member is moveable between a standby position where the brake member is spaced apart from the running wheel of the band saw, and an active position where the brake member firmly urges and stops the running wheel of the band saw. The spring member exerts a force on the brake member tending to move the brake member from the standby position toward the active position. The retainer is moveable between an engaged position where the retainer is engageable with the brake member to hold the brake member at the standby position, and a released position where the retainer is released apart from the brake member for enabling the brake member to move to the active position by the actuation of the spring member. As a result, when the band saw equipped with the emergency stop device of the present invention is working normally, the brake member is held by the retainer at the standby position. When the running band saw needs to be emergency-stopped, the emergency stop device can be started by the user to control the retainer to be separated apart from the brake member for enabling the brake member to stop the running wheel so as to further stop the cutting motion of the band saw blade.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
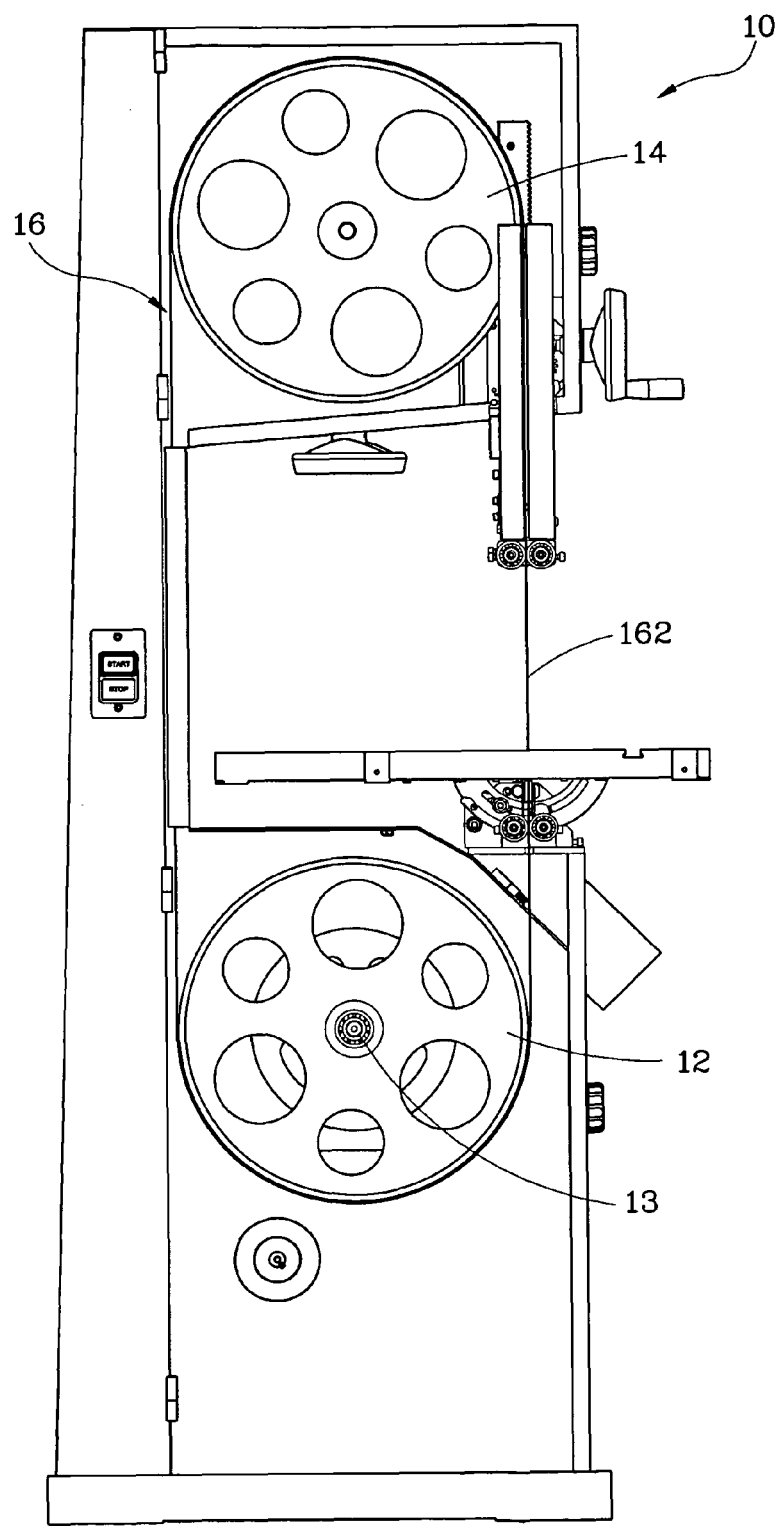
FIG. 1 is a schematic drawing showing a band saw of a prior art.
Figure 2:
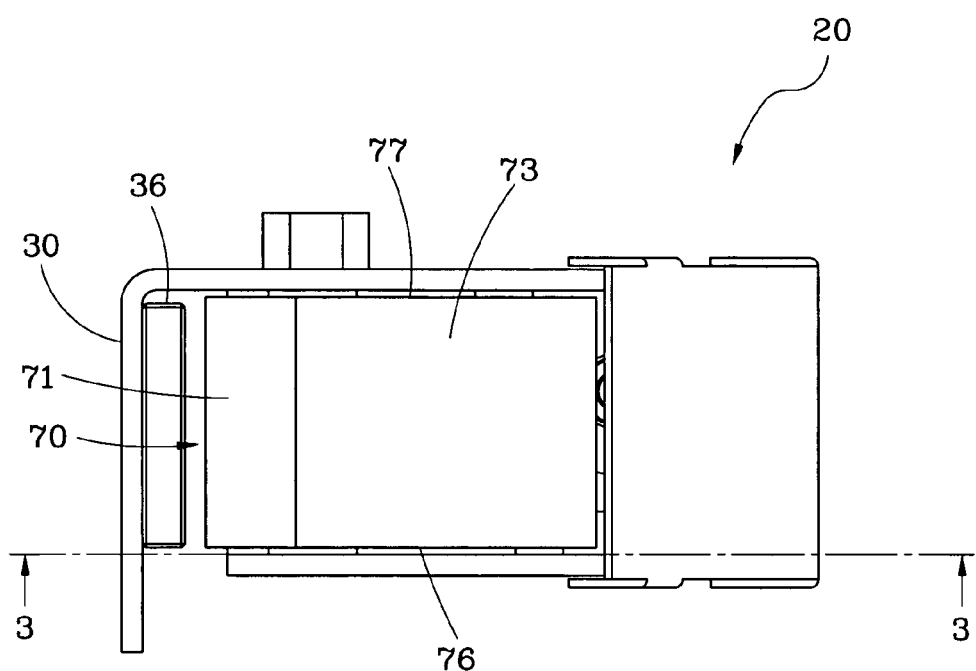
FIG. 2 is a top plan view of the emergency stop device in accordance with a preferred embodiment of the present invention.
Figure 3:
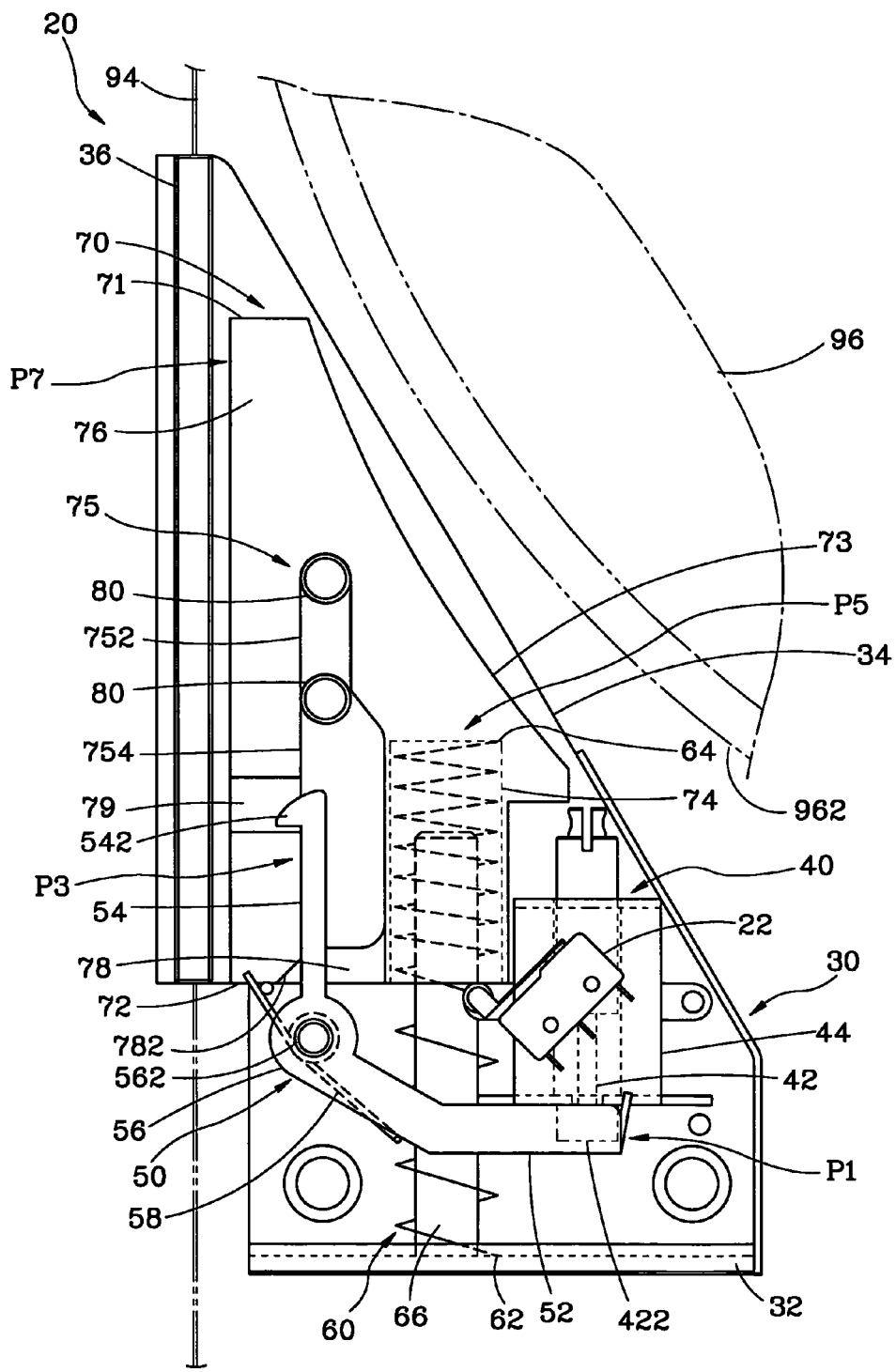
FIG. 3 is a sectional view taken along line 3-3 of FIG. 2, showing that the emergency stop device is inactive.
Figure 4:
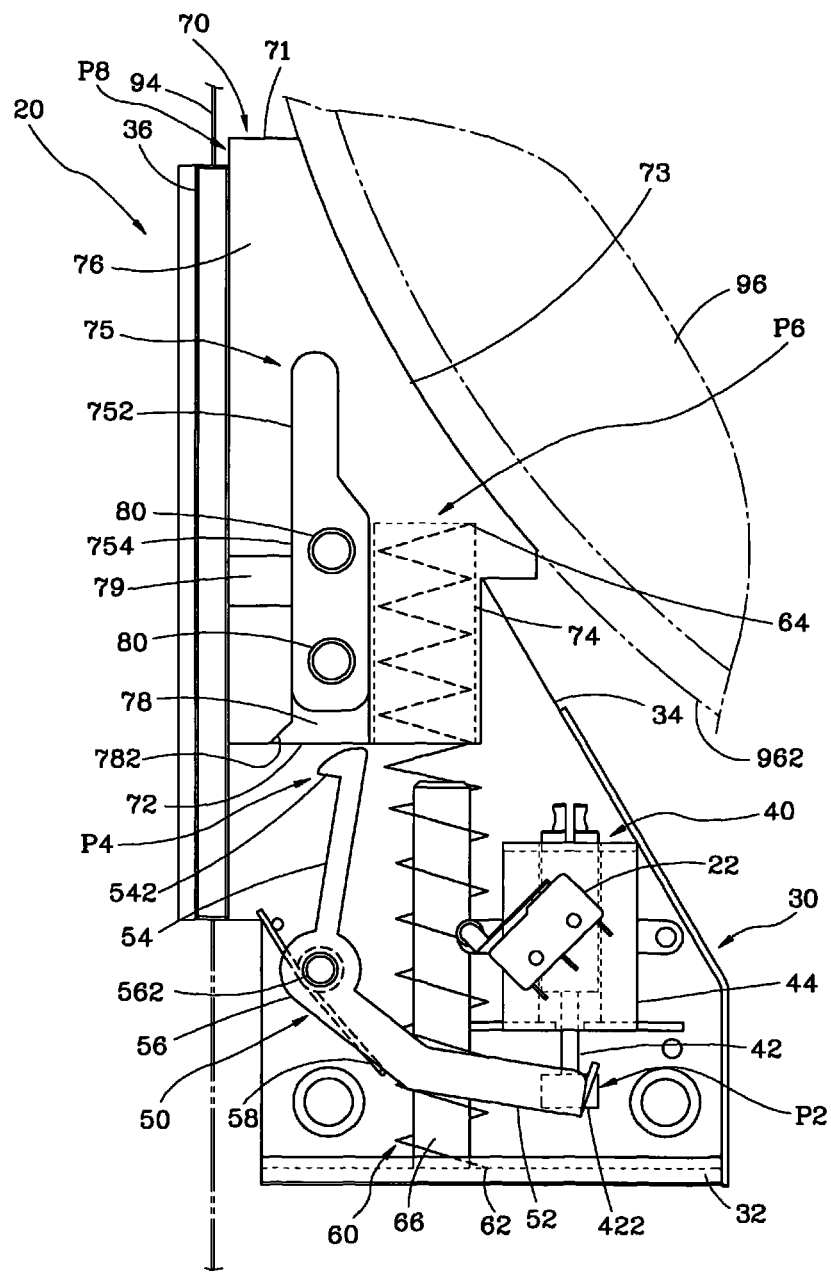
FIG. 4 is similar to FIG. 3, but showing that the emergency stop device is in action at a beginning stage.

As shown in FIGS. 2-4, an emergency stop device 20 in accordance with a preferred embodiment of the present invention comprises a bracket 30, a controller 40 disposed inside the bracket 30, a retainer 50, a spring member 60, a brake member 70 and two guides 80.

The bracket 30 has a flat bottom 32, a slanted top opening 34 and a passage 36 at a left side thereof for the passing of an endless band saw blade 94.

In the preferred embodiment of the present invention, the controller 40 is realized by using an electromagnetic switch, which includes a housing 44 mounted inside the bracket 30, and an axially moveable rod 42 protruding out of the housing 44 and having a head 422 moveable along with the rod 42 relative to the housing 44 between a retracted position P1, as shown in FIG. 3, and an extended position P2, as shown in FIG. 4. Specifically speaking, when the electromagnetic switch of the controller 40 is power-off, the head 422 of the axially moveable rod 42 is kept at the retracted position P1, as shown in FIG. 3. In case the electromagnetic switch of the controller 40 is power-on, the head 422 of the axially moveable rod 42 is moved by a magnetic force that exerts a force on the axially moveable rod 42 in a direction away from the housing 44 and eventually stopped at the extended position P2, as shown in FIG. 4. At this moment, even if the electromagnetic switch of the controller 40 is turned off, the head 422 of the axially moveable rod 42 will still stay at the extended position P2; however, the head 422 of the axially moveable rod 42 can be moved back to the retracted position P1 if an appropriate external force is exerted on the axially moveable rod 42.

The retainer 50 is realized in this preferred embodiment by using a lever having a first arm 52, a second arm 54 disposed at a right angle relative to the first arm 52 and provided at a free end thereof with a hook 542, and a pivot portion 56 disposed between the first and second arms 52 and 54 and pivotally connected with a pivot shaft 562 mounted inside the bracket 30. A torsion spring 58 is sleeved on the pivot shaft 562. One end of the torsion spring 58 is supported at a part of the bracket 30 and the other end of the torsion spring 58 is supported at the first arm 52. The free end of the first arm 52 is contacted with and pushable by the head 422 of the axially moveable rod 42 of controller 40, such that the retainer 50 is pivotally moveable about the pivot portion 56 thereof by the actuation of the axially moveable rod 42. Specifically speaking, when the head 422 of the axially moveable rod 42 stays at the retracted position P1, the second arm 54 of the retainer 50 is kept at an engaged position P3 where the hook 542 of the retainer 50 is engageable with the brake member 70, as shown in FIG. 3. At this moment, the torsion spring 58 is untwisted and kept in the normal configuration. On the other hand, in case the head 422 of the rod 42 is moved from the retracted position P1 to the extended position P2 to push the free end of the first arm 52 of the retainer 50 to move, the retainer 50 will be forced to clockwisely turn about the pivot shaft 562, such that the second arm 54 of the retainer 50 will be biased to a released position P4 where the hook 542 of the retainer 50 is separatable apart from the brake member 70, as shown in FIG. 4. At this moment, the torsion spring 58 is twisted to induce a rebound force exerting on the retainer 50 for turning the retainer 50 counterclockwise. As a result, when the electromagnetic switch of the controller 40 is turned power-off, the second arm 54 will be biased back to the engaged position P3 along with the counterclockwise rotation of the retainer 50 and the head 422 of the rod 42 can be moved from the extended position P2 back to the retracted position P1 by the push of the free end of the first arm 52 of the retainer 50.

The spring member 60 is realized by using a compression spring 60, which is sleeved on a guide rod 66 mounted to the bottom 32 of the bracket 30, and provided with a fixed end 62 fixedly mounted to the bottom 32 of the bracket 30, and a moveable end 64 moveable between a first compressed position P5 where the compression spring 60 is approximately fully compressed as shown in FIG. 3, and a second compression position P6 where the compression spring 60 is slightly compressed as shown in FIG. 4.

The brake member 70 has a relatively narrower top surface 71, a relatively wider bottom surface 72, a slantingly inwardly curved stop surface 73, a cylindrical recess 74 recessed vertically from the bottom surface 72 toward the stop surface 73, and a guide slot 75 cut through front and rear surfaces 76 and 77 of the brake member 70 and divided into a relatively narrower portion 752 and a relatively wider portion 754. On the front surface 76, a notch 78 and a locating groove 79 are recessed. The notch 78 extends upwardly from the bottom surface 72 to the bottom end of the relatively wider portion 754 of the guide slot 75 and has a beveled cut 782 at an entrance thereof. The locating groove 79 extends transversely from a left side of the brake member 70 to a middle of the relatively wider portion 754 of the guide slot 75. In addition, the moveable end 64 of the spring member 60 is disposed inside the cylindrical recess 74. When the moveable end 64 of the spring member 60 is moved from the first compressed position P5 to the second compressed position P6, the rebound force of the spring member 60 will act on the brake member 70 to move the brake member 70 from a standby position P7, as shown in FIG. 3, to an active position P8, as shown in FIG. 4.

The guides 80 are rounded posts having a diameter proximately equal to the width of the relatively narrower portion 752 of the guide slot 75. The guides 80 are protrudently and spacedly mounted on the bracket 30 and located in the guide slot 75.

Detailed description of how the above-mentioned elements of the emergency stop device 20 of the present invention will be given hereunder.

Figure 5:
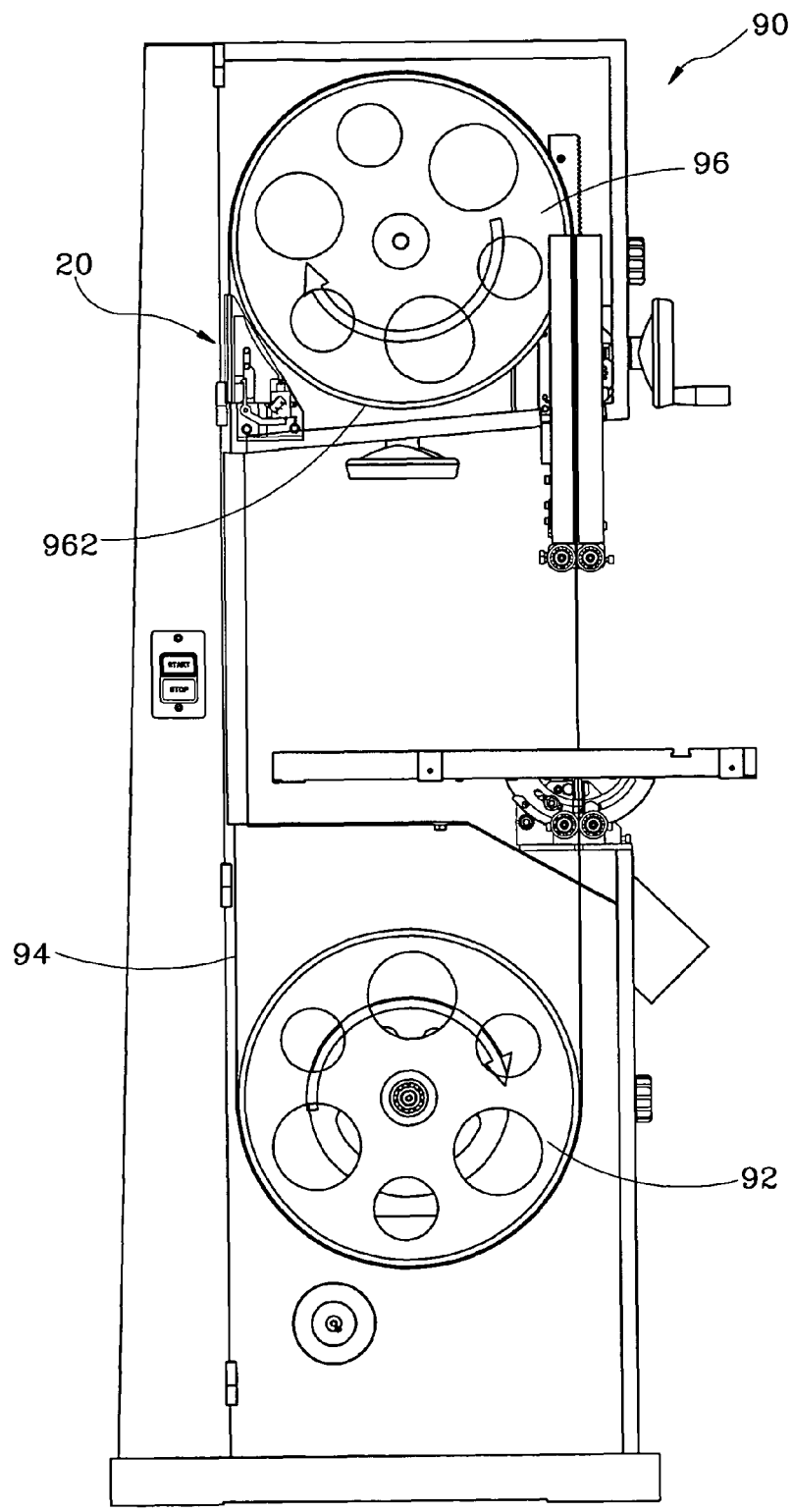
FIG. 5 is a schematic drawing showing that the emergency stop device in accordance with the preferred embodiment of the present invention is installed at a place in proximity to a follower wheel of a band saw.

As shown in FIGS. 3 and 5, the emergency stop device 20 is used in cooperation with a band saw 90 in which the bracket 30 is mounted. Normally, the band saw 90 includes two wheels, namely a drive wheel 92 directly connected to an output shaft of a motor (not shown in the drawings), and a follower wheel 96 which is driven by the drive wheel 92 through the endless band saw blade 94 looping around the drive and follower wheels 92 and 96. The emergency stop device 20 is mounted at a location of the band saw 90, which is in proximity to the contact place where the blade 94 contacts the circumference 962 of the follower wheel 96, in such a way that the blade 94 runs through the passage 36 of the bracket 30, the top surface 71 of the brake member 70 is aimed at the contact place, and the stop surface 73 of the brake member 70 is aimed at the circumference 962 of the follower wheel 96.

As shown in FIG. 3, when the emergency stop device 20 is inactive, the brake member 70 stays at the standby position P7 and compresses the spring member 60 to keep the moveable end 64 of the spring member 60 at the first compressed position P5, and the second arm 54 passes through the notch 78 to have the hook 542 be hooked on the locating groove 79 so as to firmly hold the brake member 70 at the standby position P7 and keep the moveable end 64 of the spring member 60 motionless. At this moment, the guides 80 are located in the relatively narrower portion 752 of the guide slot 75 to prohibit any transverse movement of the brake member 70. As a result, the emergency stop device 20 is set apart from the follower wheel 96, such that the band saw 90 can run normally.

When the band saw 90 needs to be emergency-stopped, the emergency stop device 20 of the present invention can be started by pushing an emergency stop button (not shown in the drawings) that is electrically connected with the controller 40 to power on the controller 40. As soon as the electromagnetic switch of the controller 40 is power-on, as shown in FIG. 4, the second arm 54 of the retainer 50 will be moved to the released position P4, i.e. the hook 542 of the second arm 54 will be released away from the locating groove 79 of the brake member 70, and thereafter the moveable end 64 of the spring member 60 will push the brake member 70 to move upwardly, such that the brake member 70 will be moved across the top opening 34 of the bracket 30 to the active position P8 where the brake member 70 urges against the running follower wheel 96. During the upward movement of the brake member 70, the relatively narrower portion 752 of the guide slot 75 will leave the guides 80 and the relatively wider portion 754 of the guide slot 75 will approach and reach the guides 80, such that a transverse gap may exist between the guides 80 and the periphery of the relatively wider portion 754, which allows the brake member 70 to move transversely. In the process of movement of the brake member 70 from the standby position P7 to the active position P8, the curved stop surface 73 of the brake member 70 will contact the circumference 962 of the running follower wheel 96, and then the brake member 70 will move transversely, and eventually be jammed between the running follower wheel 96 and the periphery wall that defines the passage 36 such that the curved stop surface 73 will firmly urge the circumference 962 of the running follower wheel 96 to stop the running of the follower wheel 96 so as to further stop the cutting motion of the band saw blade 94. On the other hand, when the controller 40 is power-on, a limit switch 22 mounted adjacent to the controller 40 will be simultaneously started by the controller 40 for enabling the band saw 90 to raise a malfunction alarm notifying ambient people.

Figure 6:
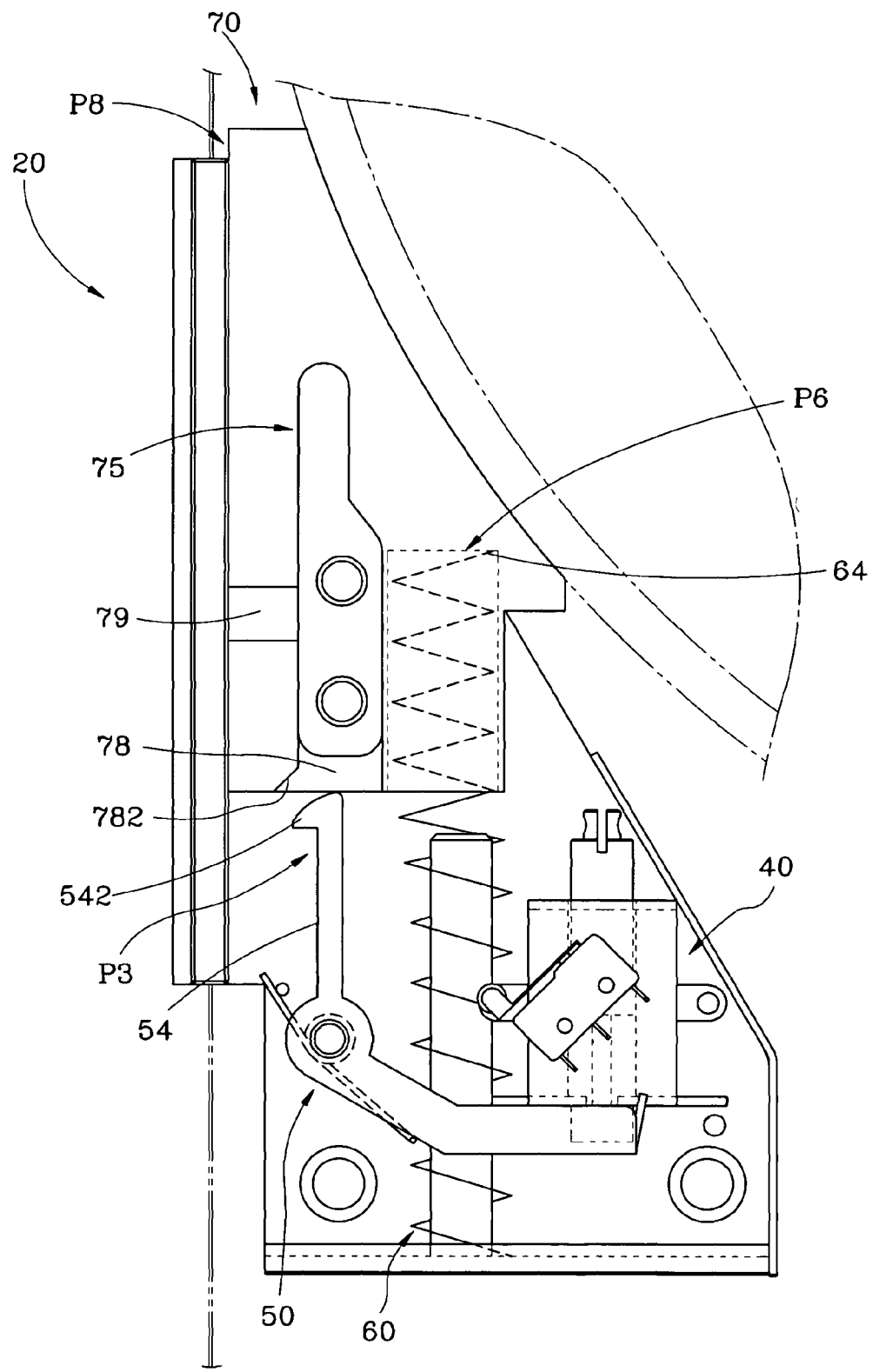
FIG. 6 is similar to FIG. 4, but showing that the emergency stop device is in action at a final stage.

FIG. 6 shows that the emergency stop device 20 is started after a predetermined period of time, in which the electromagnetic switch of the controller 40 is power-off, such that second arm 54 of the retainer 50 is swiveled back to the initial position, which is the same as the engaged position P3 but not engaged with the brake member 70 because the brake member 70 has been moved to the active position P8. At this stage, if the user wants to reset the emergency stop device 20, the user can apply an external force on the brake member 70 to move the brake member 70 back to the standby position P7 from the active position P8 and to compress the spring member 60 to make the moveable end 64 of the spring member 64 move back to the first compressed position P5 from the second compressed position P6. In the process of resetting the brake member 70, the beveled cut 782 of the notch 78 of the brake member 70 will contact the slanted top surface of the hook 542 and then slightly push the hook 542 away for enabling the second arm 54 to be inserted inside the brake member 70 through the notch 78 when the brake member 70 is kept moving, and finally the hook 542 will move back due to the rebound force of the torsion spring 58 and hook on the locating groove 79 to keep the brake member 70 at the standby position P7.

Figure 7:
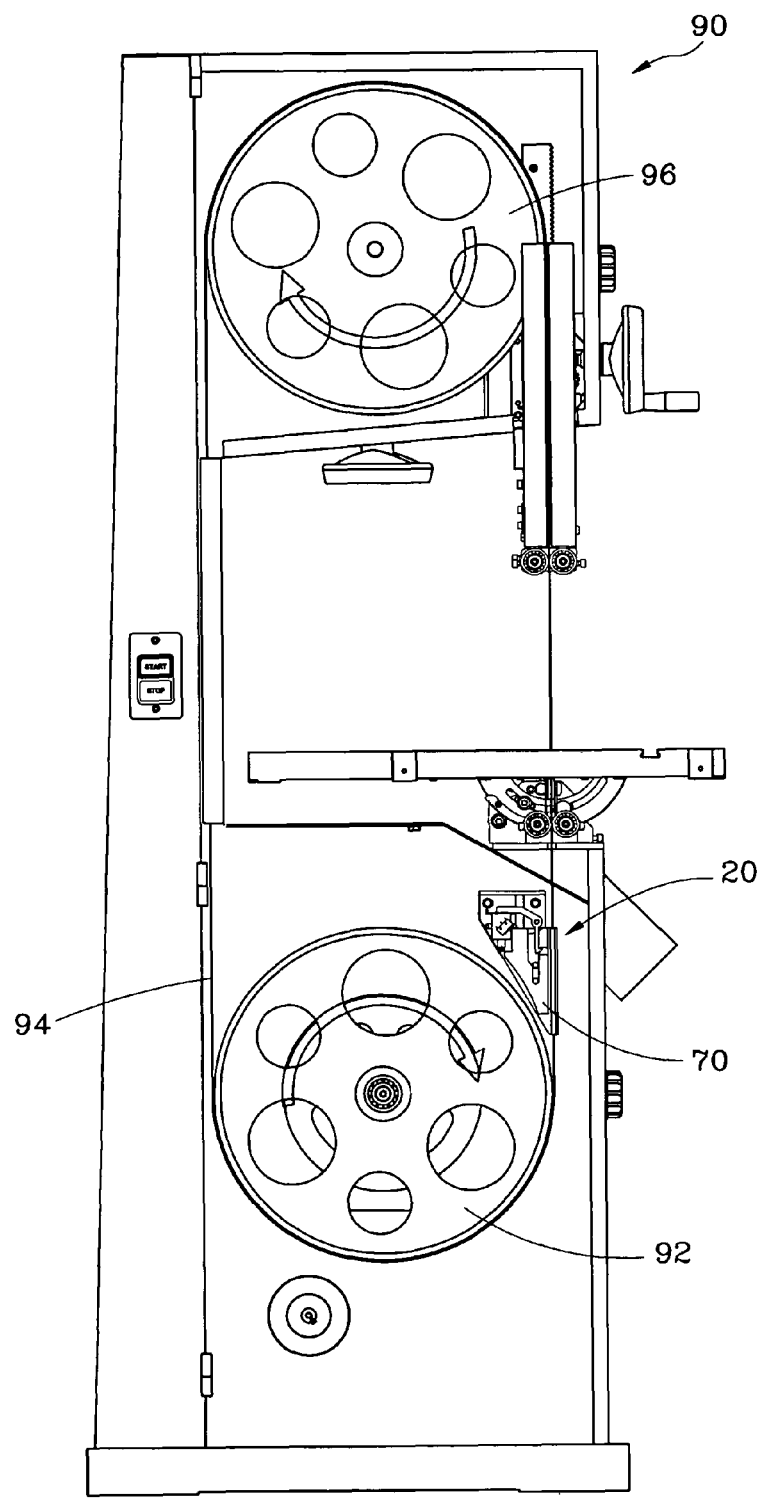
FIG. 7 is a schematic drawing showing that the emergency stop device in accordance with the preferred embodiment of the present invention is installed at a place in proximity to a right top side of a drive wheel of a band saw.
Figure 8:
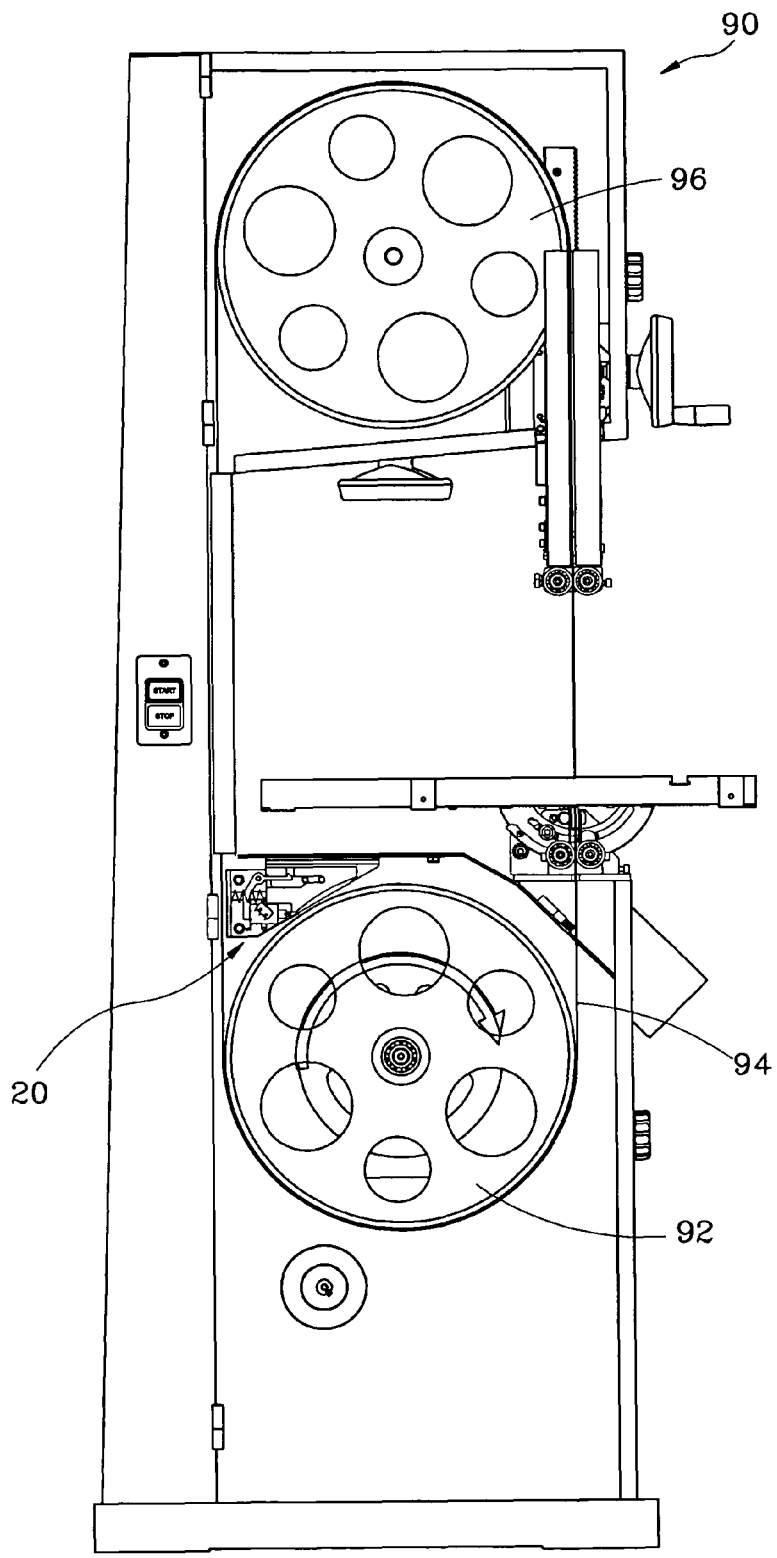
FIG. 8 is a schematic drawing showing that the emergency stop device in accordance with the preferred embodiment of the present invention is installed at a place in proximity to a left top side of a drive wheel of a band saw.

In the above-mentioned embodiment, the emergency stop device 20 of the present invention is installed in the band saw 90 in proximity to the running follower wheel 96. However, it is to be noted that the emergency stop device 20 can be installed at any appropriate position in proximity to the running follower or drive wheel 96 or 92 as along as the brake member 70 can be jammed between the periphery wall that defines the passage 36 and the follower wheel 96 or the drive wheel 92, wherein the curved stop surface 73 is firmly stopped against the circumference of the follower wheel 96 or the drive wheel 92. For example, FIG. 7 shows that the emergency stop device 20 is installed at a location in proximity to a place where the blade 94 contacts the circumference of the drive wheel 92. As soon as the emergency stop device 20 is started, the brake member 70 will firmly urge against the drive wheel 92 to stop running of the drive wheel 92 so as to stop the cutting motion of the band saw blade 94. In addition, depending on the location at which the emergency stop device 20 is installed, the blade 94 may not run through the passage 36. For example, FIG. 8 shows that the emergency stop device 20 is installed at a location in proximity to a left top side of the drive wheel 92 in such a way that the blade 94 doesn't run through the passage 36. Similarly, as soon as the emergency stop device 20 is started, the running drive wheel 92 can be stopped by the brake member 70.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A band saw comprising a running wheel, around which a band saw blade is looped, and an emergency stop device for stopping the running wheel, said emergency stop device comprising:

a bracket having a bottom portion, a top portion, a side portion and a passage formed at the side portion, the passage being defined by a plurality of side walls, the band saw blade passing through the passage;

a brake member supported by said bracket and positioned proximate to the running wheel of the band saw such that the brake member is moveable between a standby position for positioning the brake member spaced apart from the running wheel of the band saw, and an active position for positioning the brake member between the passage and the running wheel in a manner that the brake member is firmly urged against both the running wheel and one of the side walls for stopping of the running wheel, the brake member comprising a locating groove, a distal end, a curved stop surface, an abutting surface and a tapering section, the tapering section being located between the curved stop surface and the abutting surface, the tapering section being tapered off toward the distal end; the curved stop surface being abutted against the running wheel and the abutting surface being abutted against the one of the side walls when the brake member is in the active position;

a spring member exerting a force on the brake member tending to move the brake member from the standby position toward the active position;

a retainer moveable between an engaged position where the retainer is engaged with the brake member to hold the brake member at the standby position, and a released position where the retainer is released apart from the brake member for enabling the brake member to move to the active position by the actuation of the spring member, the retainer comprising a hook, a first arm, a second arm provided at a free end thereof with the hook, and a pivot portion between the first arm and the second arm, the hook being configured to be hooked on the locating groove of the brake member when the brake member stays at the standby position and the retainer stays at the engaged position, the retainer is pivotally moveable about the pivot portion between the engaged position and the released position; and a controller, the controller is an electromagnetic switch having an axially moveable rod pushable on the first arm of the retainer for pivotally moving the retainer from the engaged position to the released position;

wherein when the emergency stop device is active, the controller is powered such that the moveable rod pushes the first arm of the retainer and thus the second arm of the retainer is moved from the engaged position to the released position, and the hook is released away from the locating groove of the brake member, and thereafter the spring member pushes the brake member to move toward the active position, the brake member stays at the active position before an external force is manually applied thereon to move the brake member back to the standby position.

2. The band saw of claim 1, wherein the spring member has a fixed end and a moveable end, the movable end being connected with the brake member.

3. The band saw of claim 2, wherein the fixed end of the spring member is fixedly mounted to the bracket.

4. The band saw of claim 1, wherein the pivot portion of the retainer is pivotally connected to the bracket.

5. The band saw of claim 1, wherein the pivot portion of the retainer is mounted with a torsion spring for exerting a force on the retainer tending to move the retainer to the engaged position.

6. The band saw of claim 1, further comprising a guide; wherein the brake member comprises a guide slot in which the guide is located for guiding movement of the brake member.

7. The band saw of claim 6, wherein the guide is mounted on the bracket.

8. The band saw of claim 6, wherein the guide slot has a relatively narrower portion and a relatively wider portion; the guide is located in the relatively narrower portion of the guide slot when the brake member stays at the standby position, and the guide is located in the relatively wider portion of the guide slot when the brake member stays at the active position.

* * * * *